United States Patent [19]
Komatsu

[11] Patent Number: 5,479,191
[45] Date of Patent: Dec. 26, 1995

[54] COORDINATE INPUT DEVICE

[75] Inventor: Yasuhiro Komatsu, Osaka, Japan

[73] Assignee: Hosiden Corporation, Yao, Japan

[21] Appl. No.: 296,887

[22] Filed: Aug. 29, 1994

[30] Foreign Application Priority Data

Apr. 15, 1994 [JP] Japan ................................. 6-077479

[51] Int. Cl.⁶ .................................................. G09G 3/02
[52] U.S. Cl. ........................................ 345/161; 345/157
[58] Field of Search .................................... 345/157, 161, 345/163, 168, 156; 200/16 C; 307/116, 112

[56] References Cited

U.S. PATENT DOCUMENTS

| | | | |
|---|---|---|---|
| 4,369,439 | 1/1983 | Broos | 345/168 |
| 4,417,107 | 11/1983 | Terajima | 200/16 C |
| 4,680,577 | 7/1987 | Straayer et al. | 345/160 |
| 4,736,191 | 4/1988 | Matzke et al. | 345/157 |
| 4,870,389 | 9/1989 | Ishiwata et al. | 345/161 |
| 4,879,556 | 11/1989 | Duimel | 345/161 |
| 5,327,162 | 7/1994 | Soma | 345/161 |

FOREIGN PATENT DOCUMENTS 2247938  3/1992  United Kingdom .................. 345/156

Primary Examiner—Richard Hjerpe
Assistant Examiner—Vivian W. Chang
Attorney, Agent, or Firm—Jones, Tullar & Cooper

[57] ABSTRACT

The coordinate input device of the present invention can output a coordinate signal by using a change in a variation amount of an electrostatic capacity. Therefore, mechanical portions of the coordinate input device are reduced in number so that an increase in the life period and an improvement in reliability of the device are easily realized, while not wastefully consuming power, except during a period when the coordinate signal is outputted. The coordinate input device of the present invention outputs the coordinate signal on the basis of a variation amount of an electrostatic capacity which is defined by the position of a dielectric unit between electrode faces and an electrode face confronting these electrode faces. The dielectric unit moves in accordance with the movement of an operation knob. A program mode changeover switch is operated in accordance with the movement of a movable unit which can reciprocate together with the operation knob. When a finger(s) is (are) removed from the operation knob, the operation knob and the movable unit are returned to a home position and a reference position by home-position return springs 8 and a reference-position return spring.

11 Claims, 12 Drawing Sheets

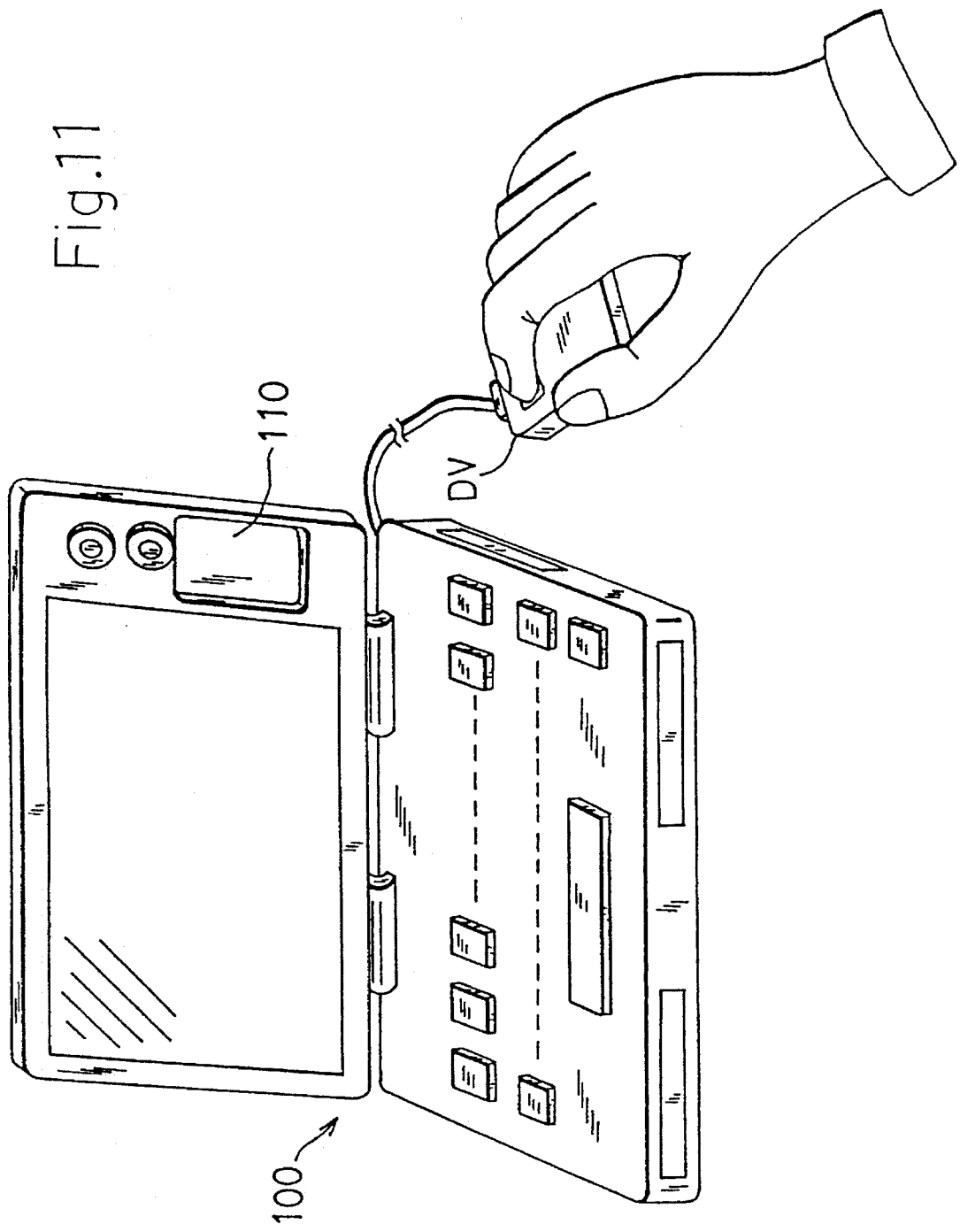

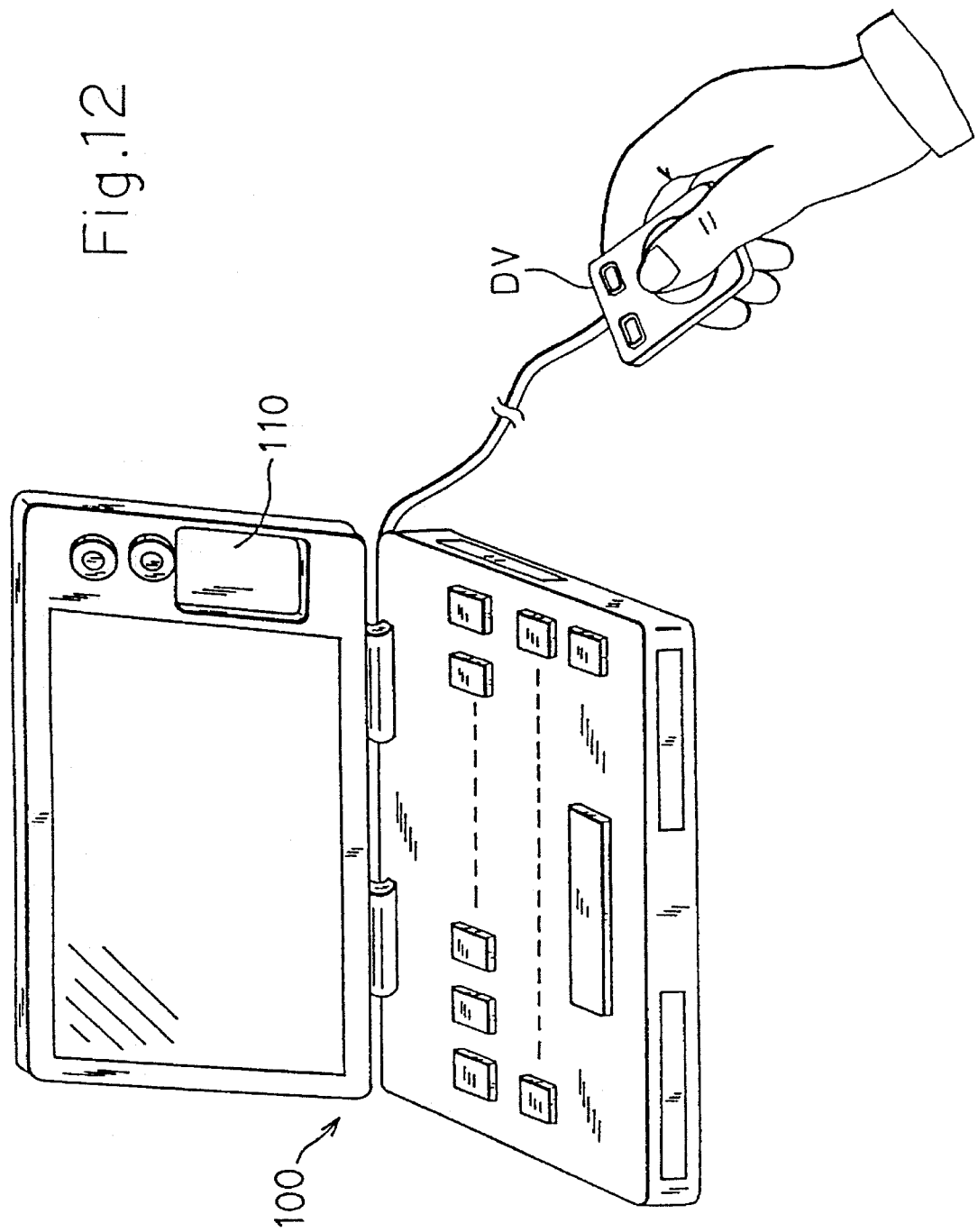

COORDINATE INPUT DEVICE

BACKGROUND OF THE INVENTION

1. Field of the Invention

The present invention relates to a coordinate input device which can change a coordinate signal on the basis of a the amount of variation an electrostatic capacity of a conductor. A coordinate input device of this kind can move the position of a cursor shown on a display device such as a CRT, in the X-axis or Y-axis direction.

2. Description of the Prior Art

In a so-called mouse which is widely used as a coordinate input device, a ball housed in the mouse is rotated by manually pulling and/or pushing the mouse on a desk or a dedicated mat, the rotation of the ball is transmitted to a vane wheel, and the rotation of the vane wheel causes a photodiode (light receiving element) to be alternately switched between an ON-state and an OFF-state, thereby generating a pulse signal. A program in a microcomputer operates in accordance with the pulse signal so that the position of a cursor shown on a display device such as a CRT is moved in the X-axis or Y-axis direction. Also in a so-called track ball in which a ball is manually rotated, a mechanism similar to that of the above-mentioned mouse is employed.

In addition to the above-mentioned mouse and track ball, known coordinate input devices through which coordinates on a display device can be input include those wherein a so-called cross key or a so-called joy stick is operated.

However, a conventional mouse or track ball has mechanical portions such as a mechanism for converting the rotation of a ball into the rotation of a vane wheel. Such mechanical portions make the structure complicated, and tend to impose restrictions on the increase in the life period and on improvements in reliability. During the use of a mouse or track ball, moreover, an LED incorporated in the mouse or track ball always consumes power, and hence it is difficult to enhance power saving.

In a coordinate input device using a cross key or a joy stick, a coordinate signal is subjected to a vector conversion by conducting operations such as the pressing of the cross key or the tilting of the joy stick, so that a cursor moves on a display device. Therefore, the sense of operating the key hardly coincides the movement of the cursor, thereby producing a problem in that there easily arises incompatibility between the key operation and the cursor motion.

Under these conditions, recently, computer specialization, provision of multiple functions for a remote controller for home use, growth in sophistication of game software, and diversification of the location of the use of these apparatuses are developing. In view of these circumstances, there is a demand to develop a coordinate input device in which an increase in the life period and improvements in reliability can easily be realized, while the power consumption is small, and the movement of the cursor on a display device coincides with the sense of the manual operation so that no incompatibility between them arises.

SUMMARY OF THE INVENTION

The present invention has resulted in view of the aforementioned circumstances.

It is an object of the present invention to provide a coordinate input device which can be used for a wide variety of purposes such as a computer and other audio visual apparatuses which sufficiently complies with the above-mentioned demand. In other words, it is an object of the present invention to enable a coordinate signal to be generated on the basis of a variation amount of an electrostatic capacity, whereby mechanical portions of a coordinate input device are reduced in number so that an increase in the life period and improvements in reliability are easily realized.

It is another object of the present invention to provide a coordinate input device which, even during the use of the device, does not wastefully consume power and consumes power during a period of outputting a coordinate signal.

It is a further object of the present invention to provide a coordinate input device in which the sense of conducting a manual operation coincides with the movement of a cursor on a display device so that incompatibility between them hardly arises.

In order to attain these objects, the coordinate input device of the present invention comprises: two conductors which confront each other in an electrically insulated manner; and a dielectric unit which is slidable in a space formed by the two confronting conductors in directions perpendicular to the confronting direction of the two conductors between a reference position and a nonreference position, which deviates from the reference position, and which, when a deviation amount from the reference position is changed, changes an electrostatic capacity of the two conductors to a value which corresponds to the deviation amount.

In the case where this configuration is employed, the following configuration may be added. Namely, in the added configuration, a coordinate signal is output on the basis of the variation Mount of the electrostatic capacity which varies in accordance with a position of the dielectric unit, and the configuration includes:

an operation knob which is slidable in a sliding direction of the dielectric unit, which can reciprocate in the confronting direction of the two conductors, and which is connected to the dielectric unit only in the sliding direction, thereby causing the dielectric unit to follow the operation knob;

a reference-position return spring for always urging the operation knob toward the reference position of the dielectric unit;

a movable unit which is reciprocated in accordance with a reciprocating operation of the operation knob in the confronting direction of the two conductors;

a home-position return spring for always urging the movable unit and the operation knob toward a projection position; and a program mode changeover switch which is switched between an ON-state and an OFF-state by a reciprocating operation of the movable unit.

According to the thus configured coordinate input device, when the operation knob is caused by a finger(s) to be slid against the force of the reference-position return spring, the dielectric unit is slid toward a nonreference position deviated from the reference position in a space formed by the two confronting conductors. When the finger(s) is (are) removed from the operation knob or the pressing force exerted by the finger(s) is reduced, the dielectric unit is returned together with the operation knob from the nonreference position to the reference position by the force of the reference-position return spring. When a potential is previously applied between the two conductors, an electrostatic capacity of the two conductors varies in accordance with the deviation amount of the dielectric unit from the reference position.

When the operation knob is pressed by a finger(s) so that the movable unit is retracted against the force of the home-position return spring, or when the pressing of the operation knob is released so that the movable unit is projected by the force of the home-position return spring, the program mode changeover switch is switched between an ON-state and an OFF-state. The force of the home-position returning springs may be set to be at a level at which the operation knob is retracted together with the movable unit by an application of a force sufficient for sliding the operation knob. When the operation knob is slid, therefore, the movable unit is retracted so that the program mode changeover switch becomes the ON-state when the operation knob is slid, and, when the finger(s) is (are) removed from the operation portion or the pressing force exerted by the finger(s) is reduced so that the dielectric unit is returned together with the operation knob to the reference position, the movable unit is projected so that the program mode changeover switch assumes the OFF-state. Consequently, power is consumed only when the program mode changeover switch is in the ON-state, or when the coordinate signal is output, and the power is not wastefully consumed except during the period of outputting the coordinate signal.

The coordinate input device of the present invention may further comprise: a determination switch for determining a coordinate signal which depends on a position of the dielectric unit in a space formed by the two confronting conductors; and a cancel switch for canceling the coordinate signal.

Alternatively, the coordinate input device may be configured so that the dielectric unit, the two conductors which sandwiches the dielectric unit, and which are respectively disposed on both sides of the dielectric unit, the reference-position return spring, the movable unit, the home-position return spring, and the operation mode changeover switch are housed in a hollow case which can manually be pulled and/or pushed while being held with a hand, the operation knob has a shaft which is connected to the dielectric unit only in the sliding direction of the dielectric unit, and a flange-like operation portion which is disposed at an end of the shaft, and which is exposed from one face of the hollow case, and a set of a determination switch and a cancel switch is disposed on both of one face and the other face of the hollow case. The coordinate input device may further comprise an operation mode changeover switch for invalidating one of a switching operation according to the determination switch and the cancel switch which are disposed on one face of the hollow case, and a switching operation according to the determination switch and the cancel switch which are disposed on the other face of the hollow case, and for validating the other switching operation. The coordinate input device of the present invention may be configured so that the operation mode changeover switch is disposed on a side face of the hollow case.

According to the thus configured coordinate input device, the coordinate signal which depends on a position of the dielectric unit is determined through the determination switch, and the coordinate signal is canceled through the cancel switch.

In the configuration wherein a set of a determination switch and a cancel switch is disposed on both faces of the hollow case, the coordinate input device may be used in the following manner. When the device is used while the face from which the operation knob is exposed is directed upward, for example, the operation knob can be operated by a finger(s) so that a usage method similar to that of a track ball is employed. When the device is used while the face from which the operation knob is exposed is directed downward, conversely, the operation knob can manually be pulled and/or pushed by hand to be moved on a desk or the like so that a usage method similar to that of a mouse is employed. In either of the above-mentioned methods, the determination switch and the cancel switch can be used. The switching operations of the determination switch and the cancel switch which are disposed on either of the faces of the hollow case can be invalidated as required by operating the operation mode changeover switch. When the above-mentioned usage methods similar to those of a track ball and a mouse are employed, therefore, this configuration is advantageous.

Alternatively, the coordinate input device of the present invention may have a specific configuration as follows: The coordinate input device may comprise:

a first member having four electrode faces which are arranged in the periphery of an aperture with equal angles;

a second member having an electrode face which confronts the four electrode faces of the first member through a gap, and an aperture which is concentric with the aperture of the first member;

a dielectric unit which is disposed between the four electrode faces of the first member and the electrode face of the second member, so as to be slidable in directions which are perpendicular to a confronting direction of the electrode faces of the members;

a movable unit which is attached to the first member so as to be able to reciprocate only in the confronting direction of the four electrode faces of the first member and the electrode face of the second member, and which has an aperture which is concentric with the apertures of the first and second members;

a program mode changeover switch which is switched between an ON-state and an OFF-state by a reciprocating operation of the movable unit;

an operation knob having a shaft, and a flange-like operation portion which is disposed at an end of the shaft, the shaft being loosely passed through the apertures of the movable unit and the second member to be connected to the dielectric unit so as to be movable in an axial direction, the flange-like operation portion slidably overlapping with a peripheral portion of the aperture of the movable unit;

a reference-position return spring, interposed between the shaft of the operation knob and the movable unit, for always urging the operation knob toward a reference position;

a home-position return spring, interposed between the movable unit and the first member, for always urging the movable unit and the operation knob toward a projection position; and a hollow case which houses the first member, the second member, the dielectric unit, the movable unit, the program mode changeover switch, the reference-position return spring, and the home-position return spring, and which can manually be pulled and/or pushed while being held with a hand, the operation portion of the operation knob being exposed from one face side of the hollow case.

In the coordinate input device having the configuration noted, the determination switch and the cancel switch which are described above may be disposed, and/or the operation mode changeover switch may be disposed.

The coordinate input device of the present invention may be detachably mounted on a case of a computer apparatus having a display device on which a cursor is to be displayed. According to this configuration, the coordinate input device can be used under a state in which the device is mounted on the case of the computer apparatus, or a state in which the device is separated from the case.

As described above, the coordinate input device of the present invention employs a system in which the position of the dielectric unit is changed between two conductors (confronting electrode faces) by sliding the operation knob and a coordinate signal corresponding to the variation amount of the electrostatic capacity defined by the position of the dielectric unit. Therefore, mechanical portions of the coordinate input device are reduced in number, thereby attaining an effect that an increase in the life period and an improvement in reliability are easily realized. Even during the use of the device, the device does not consume power wastefully, and except for a period of outputting the coordinate signal, does not consume power, thereby attaining another effect that the power saving is enhanced. When a usage method similar to that of a track ball or that of a mouse is employed, the sense of conducting a manual operation coincides with the movement of a cursor on a display device, thereby attaining a further effect that incompatibility hardly arises in the sense of conducting a manual operation.

In addition, the present invention can attain a still further effect in that a reduced number of mechanical portions facilitate the thinning and/or miniaturization of the device.

These and other features, objects and advantages of the present invention will be more fully apparent from the following description of the preferred embodiments thereof.

BRIEF DESCRIPTION OF THE DRAWINGS

FIG. 11 is a diagrammatic perspective view showing a usage state of the coordinate input device which is separated from the case of the computer apparatus; and FIG. 12 is a diagrammatic exploded perspective view showing another usage state of the coordinate input device which is separated from the case of the computer apparatus.

DETAILED DESCRIPTION OF THE PREFERRED EMBODIMENTS

Figure 1:
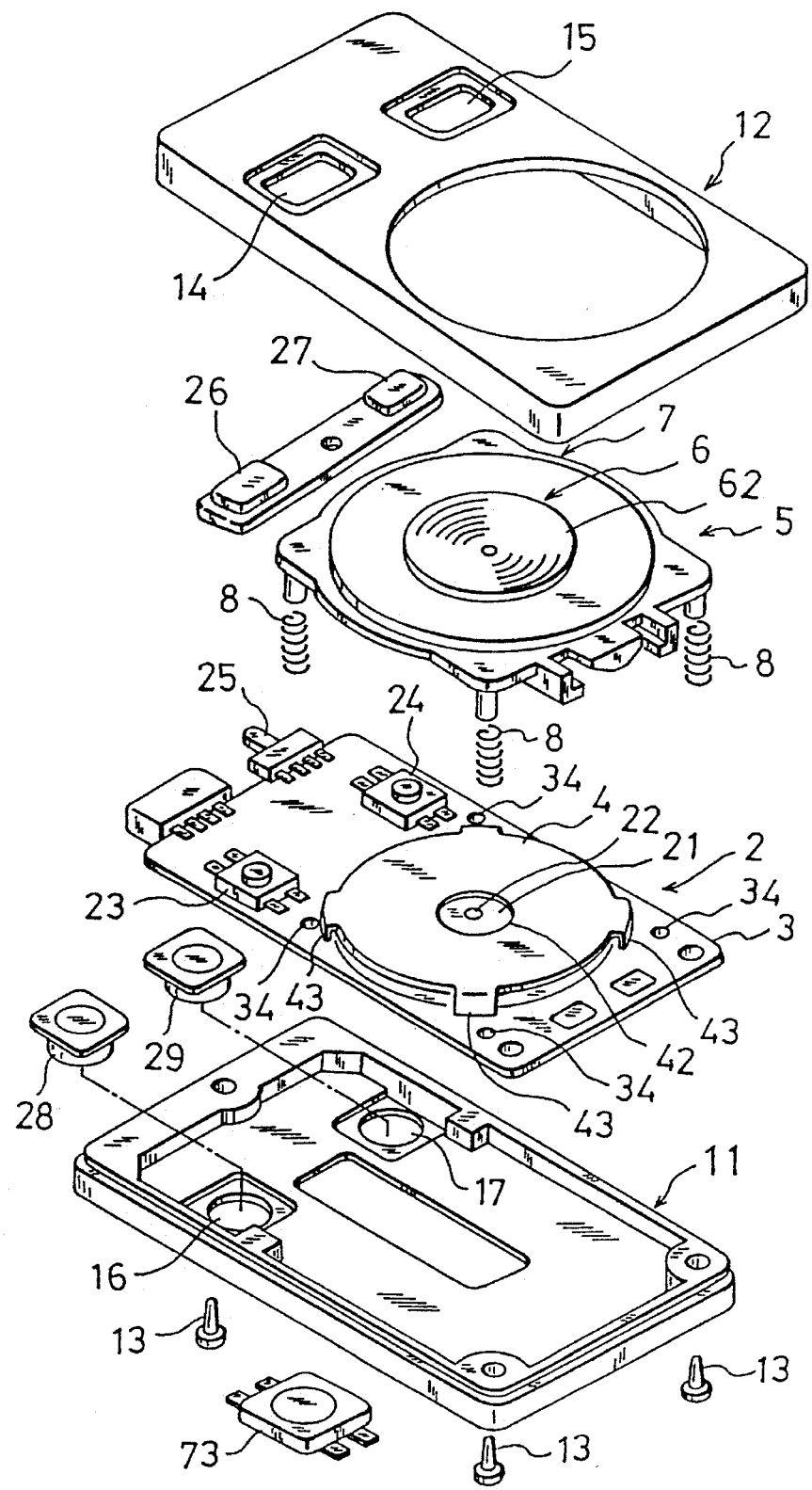
FIG. 1 is an exploded perspective view showing components of a coordinate input device according to one embodiment of the present invention.

In FIG. 1, 11 designates a lower case, and 12 designates an upper case. The cases 11 and 12 are fixed to each other by screws 13 to form a hollow case 1 shown in FIG. 4. The hollow case 1 has an external shape which is a flat rectangular parllelepiped, and the length, width and height of the hollow case are about 50 mm, 30 mm and 10 mm, respectively. Namely, the hollow case has a size which fits in the palm of a hand of an adult, so that the hollow case is manually pulled and/or pushed so as to be slid on a desk while being held with a hand, and that an operation knob 6 which will be described later is operated with a finger(s) while the hollow case is held with a hand. In other words, the hollow case 1, and the operation knob 6 can be manually operated. An electrical mechanism 2 shown in FIG. 2, and a mechanical mechanism 5 shown in FIG. 3 are housed in the hollow case 1.

The electrical mechanism 2 will be described with reference to FIGS. 1 and 2.

Figure 6:
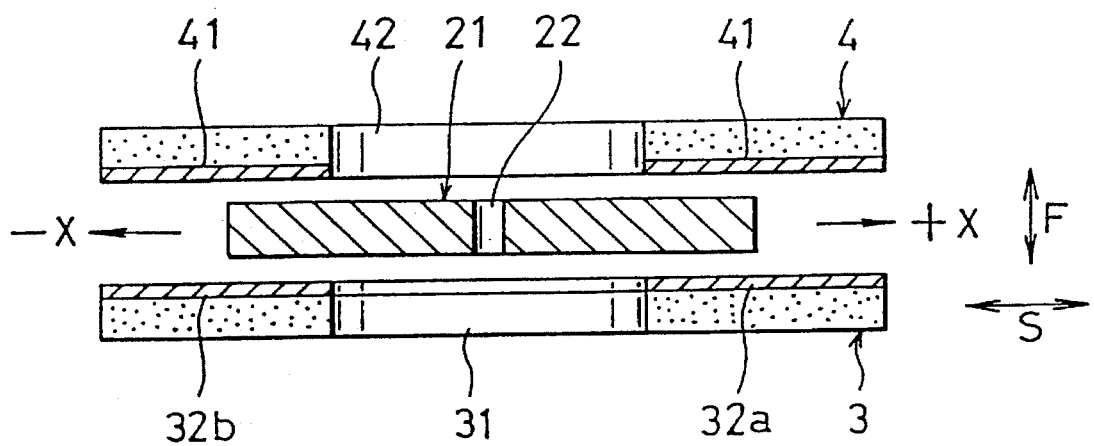
FIG. 6 is a diagrammatic section view showing the main portion of the coordinate input device.

The electrical mechanism 2 comprises a disk-like dielectric unit 21 having a center hole 22, a first member 3, a second member 4, etc. The first member 3 includes an insulating substrate having a circular aperture 31 which has a relatively large diameter (about 10 mm), and four electrode faces 32a to 32d which are arranged so as to surround the aperture 31 and at equal angles (90 deg.). Mounted on the first member 3, are determination switches 23, cancel switches 24, a transmitter 25 including an optical device and HF devices, and other necessary electrical components. The second member 4 has a metal plate having one face (back face) which is formed as an electrode face, or an insulating substrate which comprises a single electrode face 41 (see FIG. 6) formed on the whole of one face. An aperture 42 which is identical in shape and size with the aperture 31 of the first member 3 is formed at the center of the second member 4. Four claws 43 . . . are formed on the periphery of the second member 4. The second member 4 is attached to the first member 3 by respectively inserting the four claws 43 into slit-like mounting holes 33 . . . formed in the first member 3, to be engaged therewith.

When the second member 4 is attached to the first member 3, the aperture 42 is disposed so as to be concentric with the aperture 31 of the first member 3, and the single electrode face 41 confronts through a small gap the four electrode faces 32a to 32d of the first member 3. The dielectric unit 21 is located between the four electrode faces 32a to 32d of the first member 3 and the single electrode face 41 of the second member 4. The dielectric unit 21 is slidable in directions S (see FIG. 6) which are perpendicular to the confronting direction F of the electrode faces 32a to 32d of the first member 3 and the electrode face 41 of the second member 4. Also the electrode face 41 of the second member 4 is provided with a connecting terminal. The electrode faces 32a to 32d of the first member 3, and the electrode face 41 of the second member 4 correspond to two conductors which confront each other so as to sandwich the dielectric unit 21.

Figure 7:
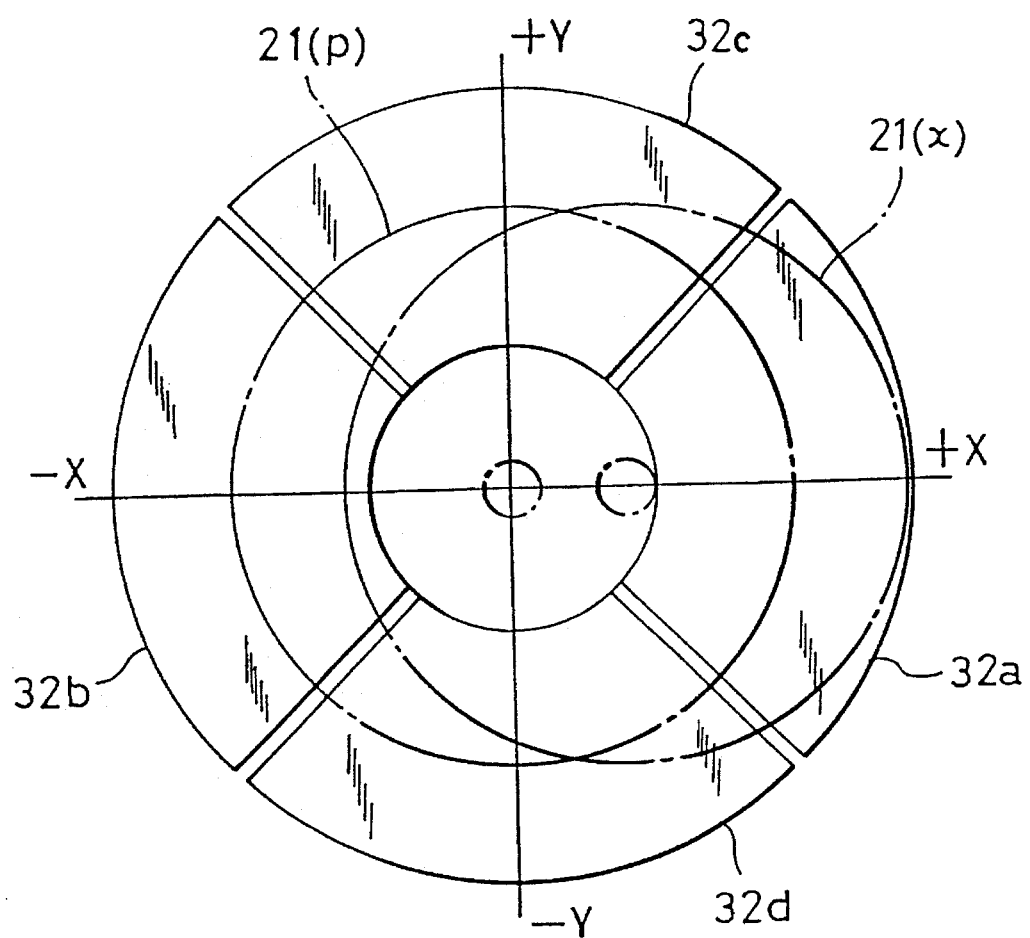
FIG. 7 is a diagrammatic plan view showing the main portion of the coordinate input device.

In the above-mentioned three-layer structure, each of the four electrode faces 32a to 32d of the first member 3, the electrode face 41 of the second member 4, and the dielectric unit 21 cooperate to concentric a variable capacitor. When the two electrode faces 32a and 32b confronting each other on the first member 3 correspond to the X-axis and the other two confronting electrode faces 32c and 32d correspond to the Y-axis as shown in FIG. 7, the overlapping state (confronting area) between the four electrode faces 32a to 32d and the dielectric unit 21, which is located at a nonreference position indicated by a symbol x in the figure, is different from the overlapping state (confronting area) between the four electrode faces 32a to 32d and the dielectric unit 21 which is located at a reference position indicated by a symbol p in the figure. Therefore, various overlapping states of the four electrode faces 32a to 32d with respect to the dielectric unit 21 can be set by sliding the dielectric unit 21 between the four electrode faces 32a to 32d of the first member 3 and the electrode face 41 of the second member 4. The overlapping states depend on the position of the dielectric unit 21. When a potential is applied between the four electrode faces 32a to 32d of the first member 3 and the electrode face 41 of the second member 4, the electrostatic capacity can vary in accordance with the amount of deviation of the dielectric unit 21 from the reference position. Coordinate signals in the X-axis and Y-axis directions can be produced on the basis of the amount of variation.

Figure 8:
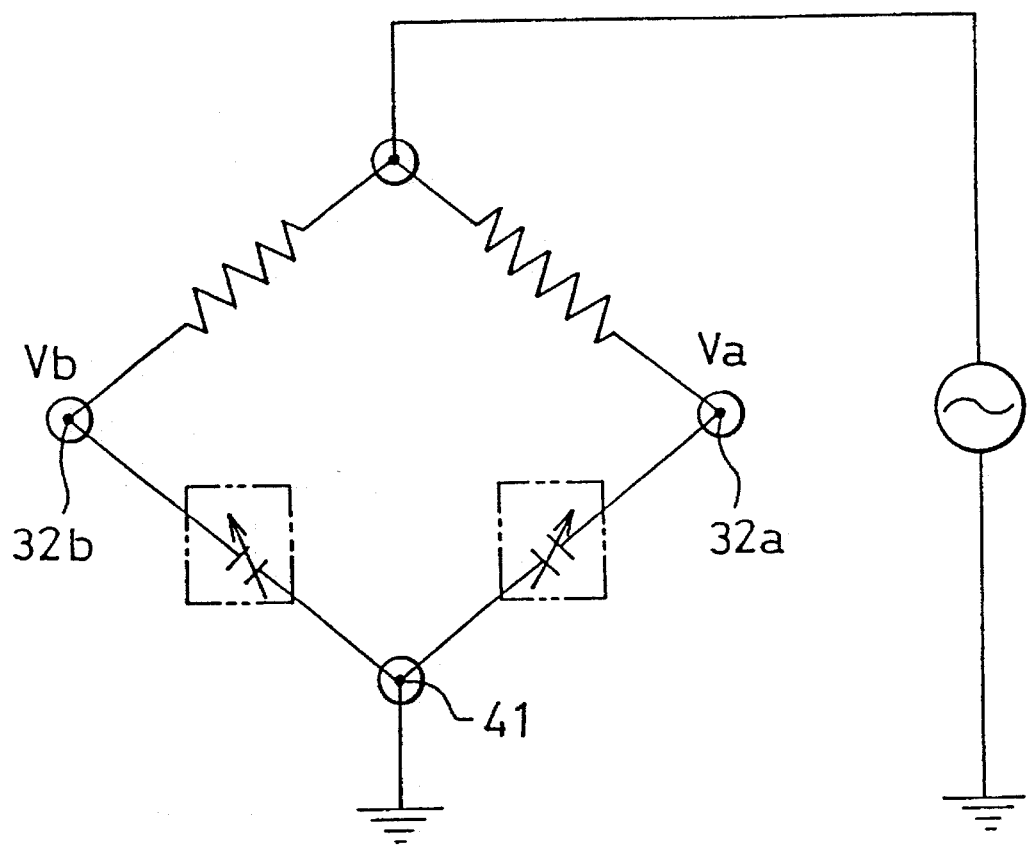
FIG. 8 is a circuit diagram showing an example of a bridge circuit for producing a coordinate signal.

FIG. 8 shows an example of a bridge circuit for producing a coordinate signal in the X-axis direction. When the dielectric unit 21 is slidingly moved rightward or leftward (in the X-axis direction) from the reference position p shown in FIG. 7, the electrostatic capacities between the two electrode faces 32a and 32b of the first member 3 in the X-axis direction and the electrode face 41 of the second member 4 vary, and the balancing state of the bridge circuit of FIG. 8 is lost so that a differential voltage is generated between Va and Vb. Although not shown, a bridge circuit for producing a coordinate signal in the Y-axis direction operates in the same manner. When the coordinate signals in the X-axis and Y-axis directions are synthesized and processed, therefore, a synthesized coordinate signal can be displayed on a display device (not shown). In the configuration wherein a differential voltage between Va and Vb is generated to produce a coordinate signal as described above, errors due to accuracy in the scattering of components or environmental factors cancel each other, and therefore the detection can be conducted with high accuracy.

Next, the mechanical mechanism 5 will be described with reference to FIGS. 1 and 3. The mechanical mechanism 5 comprises the operation knob 6, a movable unit 7, home-position return springs 8, and a reference-position return spring 9. The operation knob 6 has a shaft 61, and a flange-like operation portion 62 which is disposed at an end of the shaft 61. The movable unit 7 has at the center an aperture 71 which is identical in shape and size with the apertures 31 and 42 of the first and second members 3 and 4, and shafts 72 . . . which are respectively disposed at four positions around the periphery of the moveable unit 7. The four shafts 72 . . . are slidably inserted in the axial direction into through holes 34 . . . formed in the first member 3, so that the movable unit 7 is attached to the first member 3 in a reciprocating manner. The direction of the reciprocating motion coincides with the abovementioned confronting direction F (see FIG. 6). In the movable unit 7 attached to the first member 3, the aperture 71 is located so as to be concentric with the apertures 31 and 42 of the first and second members 3 and 4. The home-position returning springs 8 are respectively fitted onto the shafts 72 . . . so as to be interposed between the first member 3 and the movable unit 7. Each of the home-position return springs 8 consists of a coil spring and always urges the movable unit 7 in the projection direction.

Figure 5:
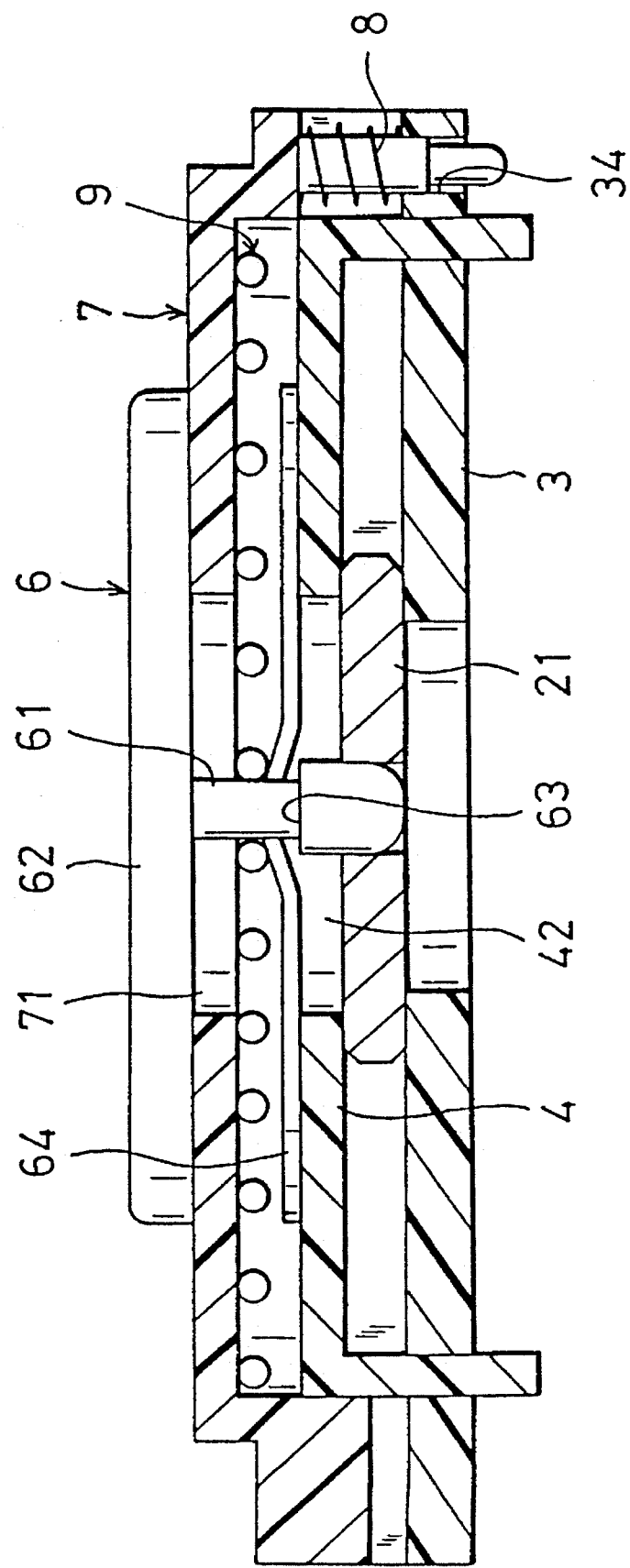
FIG. 5 is a diagram showing a section of the main portion of the coordinate input device.

As seen from FIG. 5, the shaft 61 of the operation knob 6 is loosely passed through the apertures 71 and 42 of the movable unit 7 and the second member 4, and the operation portion 62 of the operation knob 6 slidably overlaps with the peripheral portion of the aperture 71 of the movable unit 7. A snap ring 64 is attached to the shaft 61 by using a step portion 63 which is formed on the shaft 61. As shown in FIG. 3, the snap ring 64 is obtained by forming a hole 65 with slits at the center of a circular sheet of synthetic resin, and the shaft 61 is fitted into the hole 65. The reference-position return spring 9 consists of a spiral spring, and is housed in the back side of the movable unit 7 while the end in the center portion is fixed to the shaft 61 of the operation knob 6. The upper face of the movable unit 7 is exposed from one face of the hollow case 1, and also the operation portion 62 of the operation knob 6 is exposed from the one face of the hollow case 1.

Figure 2:
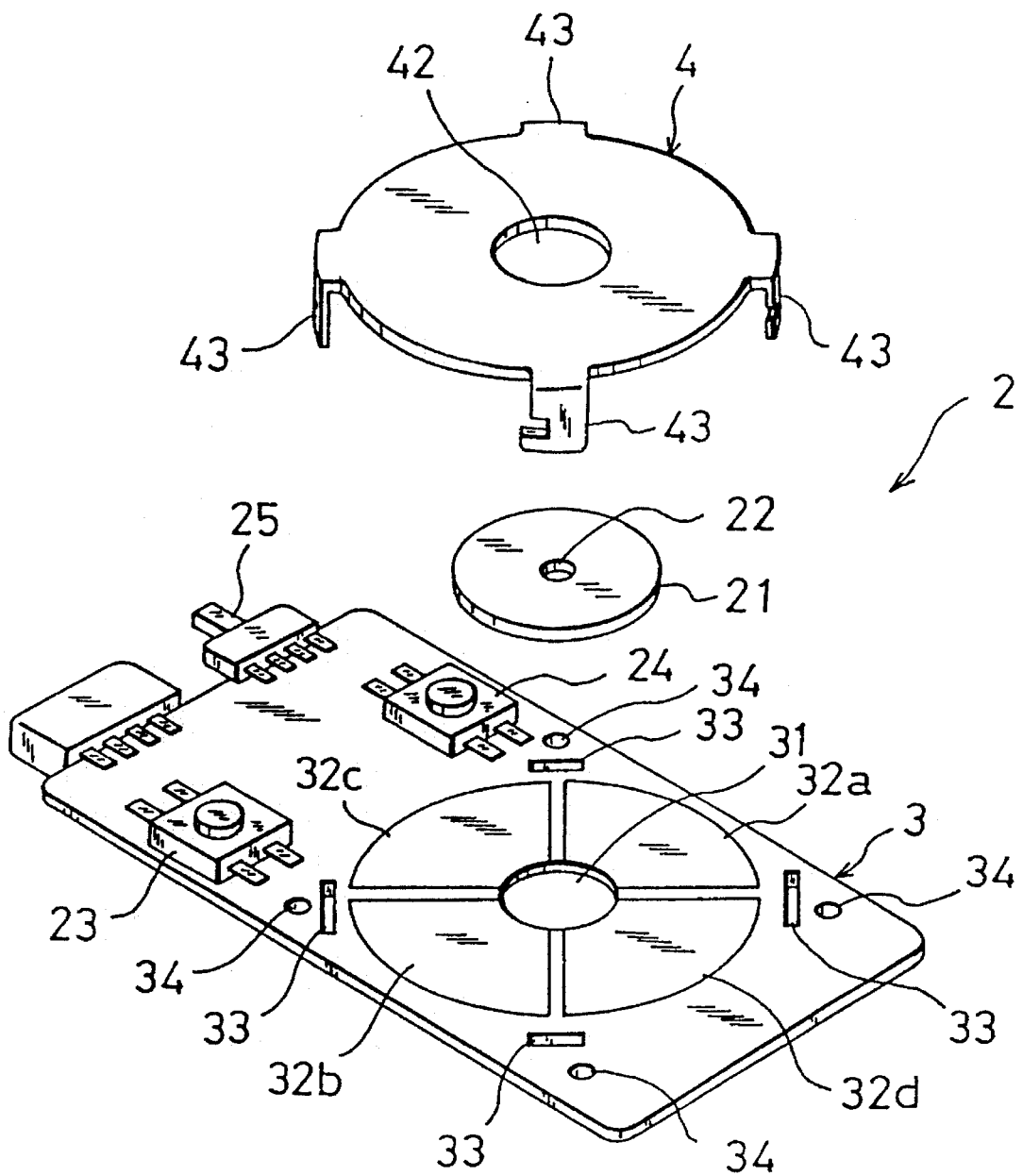
FIG. 2 is an exploded perspective view showing an electrical mechanism of the coordinate input device.
Figure 3:
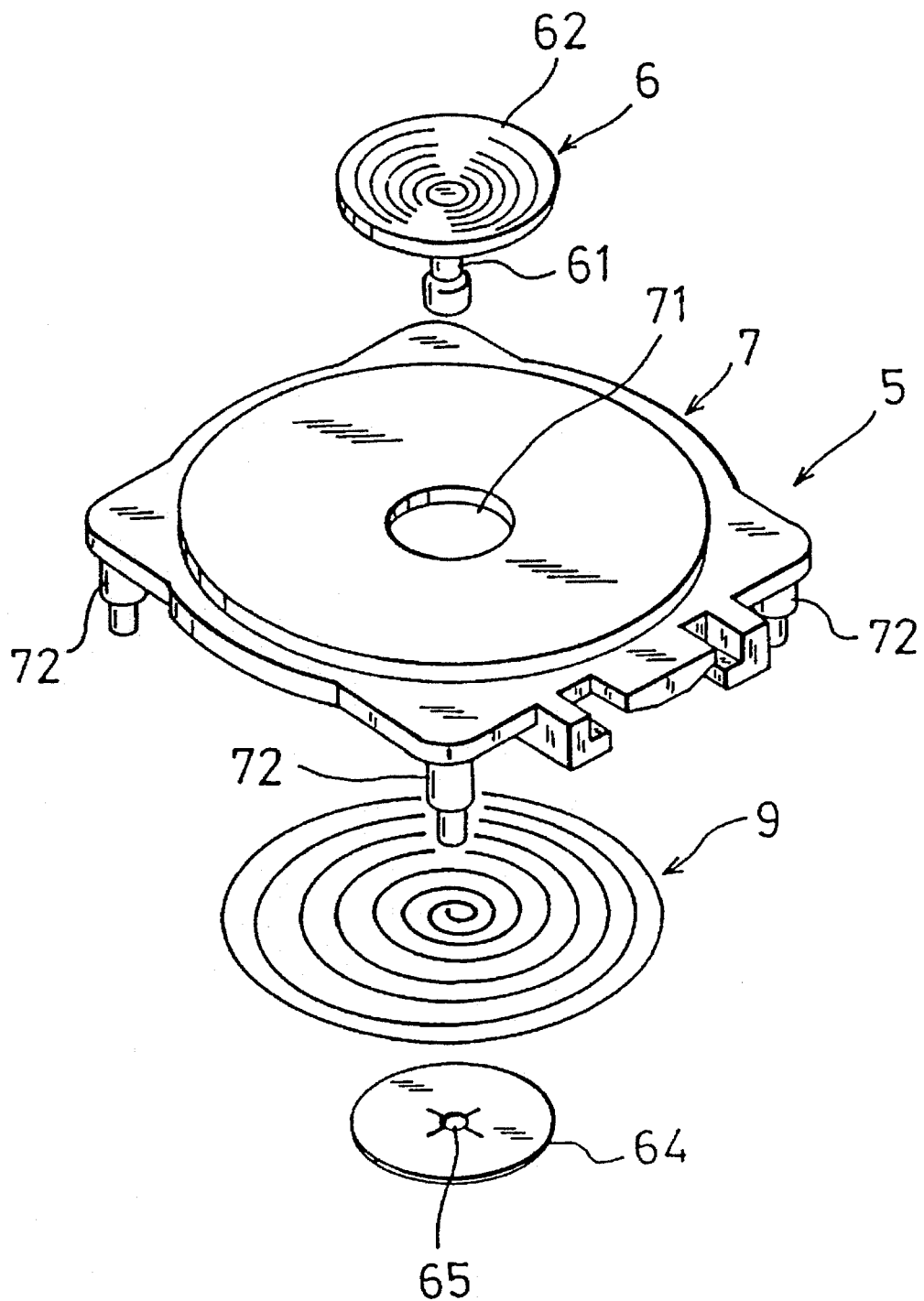
FIG. 3 is an exploded perspective view showing a mechanical mechanism of the coordinate input device.

The determination switches 23 shown in FIGS. 1 and 2 are switches for determining the above-mentioned coordinate signals, and the cancel switches 24 are switches for canceling the coordinate signals. All of these switches are keyswitches. One set of the determination switches 23 and the cancel switches 24 is mounted on each of the front and back faces of the first member 3. Key tops 26 and 27 corresponding to the determination switch 23 and the cancel switch 24 which are mounted on the front face of the first member 3 are exposed from two apertures 14 and 15 in the upper case 12, and key tops 28 and 29 corresponding to the determination switch and the cancel switch which are mounted on the back face of the first member 3 are exposed from two apertures 16 and 17 of the lower case 11.

Figure 4:
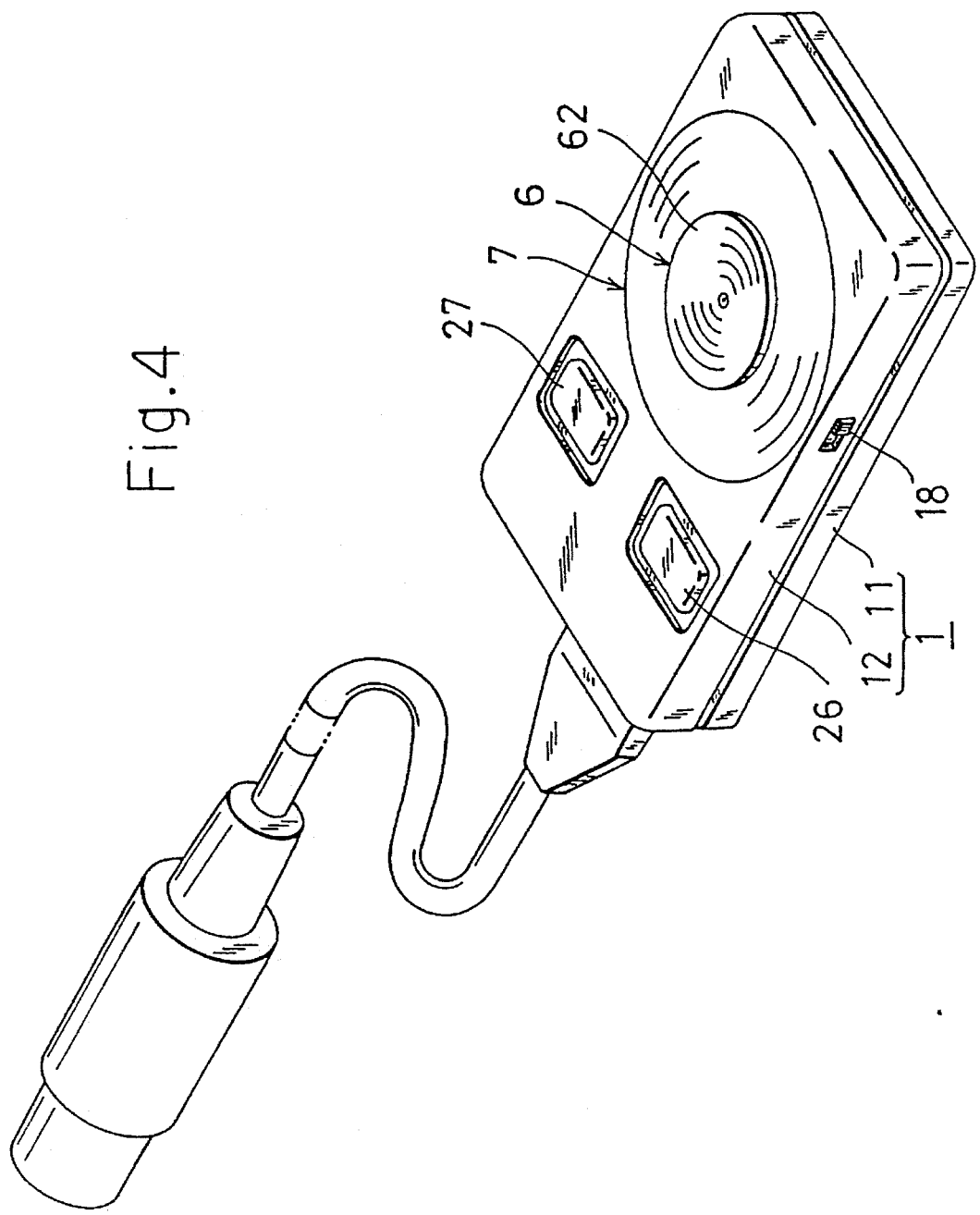
FIG. 4 is an external view of the coordinate input device.

Regarding the switching operation according to the determination switch 23 and the cancel switch 24 which can be operated on one face of the hollow case 1, and that according to the determination switch and the cancel switch which can be operated on the other face of the hollow case 1, one of the switching operations can be invalidated and the other switching operation can be validated by operating an operation mode changeover switch 18 which is disposed on a side face of the hollow case 1 as shown in FIG. 4.

In FIG. 1, 73 designates a program mode changeover switch which may be a keyswitch. The program mode changeover switch 73 is a switch in which the ON and OFF states are switched in accordance with the reciprocating motion of the movable unit 7. In the embodiment, when the movable unit 7 is projected (the unit is returned by the force of the home-position returning springs 8), the switch 73 assumes the OFF state, and, when the movable unit 7 is retracted (the unit is pressed against the force of the home-position returning springs 8), the switch 73 assumes the ON state. The linkage operation of the movable unit 7 and the programmode changeover switch 73 may be realized by directly connecting the movable unit 7 with the actuator of the program mode changeover switch 73. Alternatively, the linkage operation may be realized by electrical means.

In the coordinate input device described above, the force of the home-position return springs 8 is set to a level at which the operation knob 6 is retracted (or pressed) together with the movable unit 7 when a force sufficient for sliding the operation knob 6 against the force of the reference-position return spring 9 is applied to the operation portion 62. When a finger(s) is (are) placed on the operation portion 62 of the operation knob 6 and the operation portion 62 is slid, therefore, the operation knob 6 is surely pressed together with the movable unit 7 against the force of the home-position return springs 8, and the retraction (pressing) of the movable unit 7 causes the programmode changeover switch 73 to be changed from the OFF state to the ON state. When the finger(s) is (are) removed from the operation portion 62 or the pressing force exerted by the finger(s) is reduced, the operation knob 6 and the movable unit 7 are projected by the force of the home-position return springs 8 to return to their home positions, whereby the program mode changeover switch 73 is changed from the ON state to the OFF state. Furthermore, the operation knob 6 is returned together with the dielectric unit 21 to the reference position by the force of the reference-position return spring 9.

If the device is controlled so that the coordinate signal is output under the state where the program mode changeover switch 73 is in the ON state, therefore, power is consumed only when the program mode changeover switch is in the ON state, or when the coordinate signal is output, and the power is not wastefully consumed, the power consumption occurring only during the period of outputting the coordinate signal.

Figure 9:
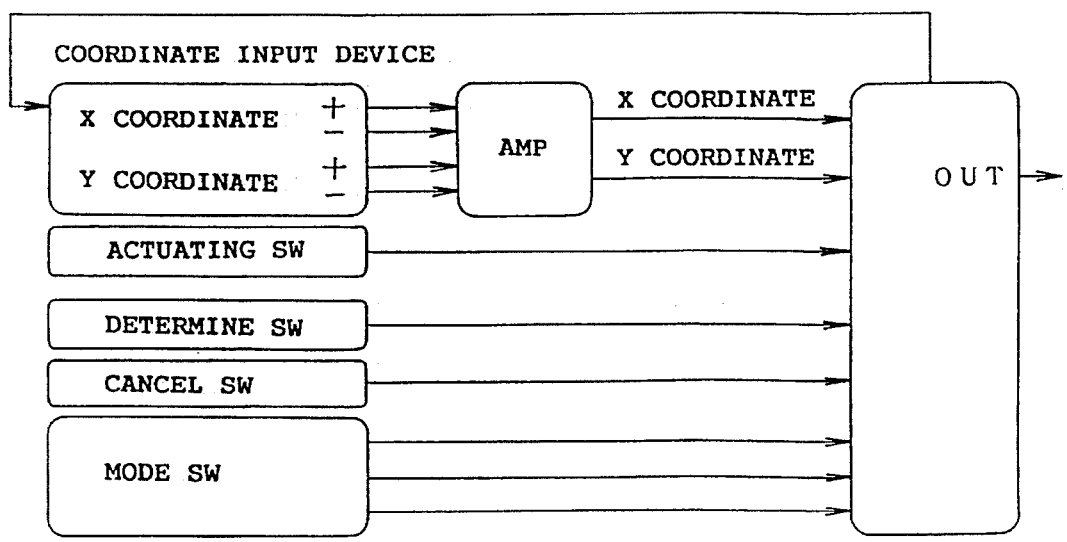
FIG. 9 is a block diagram of a system to which the coordinate input device is applied.

In the coordinate input device described above, for example, a control system which is shown in the block diagram of FIG. 9 may be employed so that the coordinate signal is displayed on a display device such as a CRT of a computer apparatus or output from the transmitter 25.

For example, the coordinate input device can be operated as follows: The operation portion 62 of the operation knob 6 is pressed by a finger(s) so that the movable unit 7 is pushed inward. Then, the program mode changeover switch 73 is changed to the ON state and a predetermined program begins to operate. When the operation portion 62 is slid so that the dielectric unit 21 follows the movement of the operation portion, therefore, a cursor on the display device moves in the direction corresponding to the sliding direction of the operation portion 62. When the cursor reaches a desired position, the key top 26 is pressed to cause the determination switch 23 to operate, and the coordinate signal at this time is determined. The determined coordinate signal can be canceled by pressing the key top 27. Since the sliding distance of the operation portion 62 is restricted by bumping the shaft 61 of the operation knob 6 against the edge of the aperture 71 of the movable unit 7, there may be a case where a single operation of the operation portion 62 is not sufficient for moving the cursor to the desired position. In this case, the force exerted by the finger(s) to press the operation portion 62 is reduced. This reduction of the pressing force allows the operation knob 6 to be returned together with the dielectric unit 21 to the reference position by the force of the reference-position return spring 9. At this time, the movable unit 7 is projected by the force of the home-position return springs 8, thereby changing the state of the program mode changeover switch 73 to the OFF state. Consequently, the program stops the operation so that the cursor remains at the position at this time, and power consumption is ceased. Thereafter, the same operation is repeated so that the cursor is advanced to the desired position.

As described above, the coordinate input device of the embodiment can be used in such a manner that the operation portion 62 of the operation knob 6 is operated by a finger(s). This usage is similar to that of a conventional track ball. Furthermore, the coordinate input device can be used in another manner that the coordinate input device is manually pulled and/or pushed so as to be slid on a flat face such as a desk while being held with a hand. This usage is similar to that of a conventional mouse. More specifically, when the hollow case 1 is manually pulled and/or pushed by a hand so as to be slid on a flat face such as a desk while the one face of the case is directed downward, the operation portion 62 can cause the dielectric unit 21 to be slid between the reference position and a position separated therefrom, in the same manner as the case where the operation portion 62 is operated by a finger(s). Consequently, the coordinate input device can be used in either of two usage manners one of which is similar to that of a track ball, and the other of which is similar to that of a mouse. When one of the usage manners is to be employed, the operation mode changeover switch 18 is operated, whereby one of the switching operations: the switching operation according to the determination switch 23 and the cancel switch 24 which can be operated on one face of the hollow case 1; and that according to the determination switch and the cancel switch which can be operated on the other face of the hollow case 1, is invalidated and the other switching operation is validated.

Figure 10:
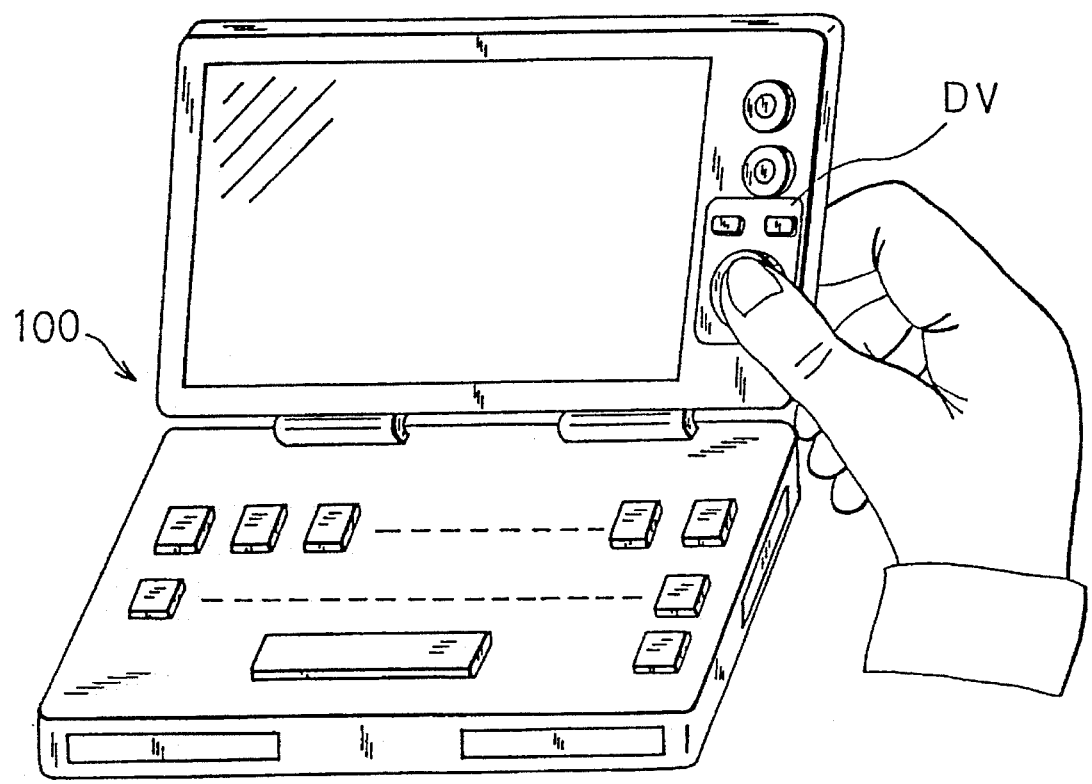
FIG. 10 is a diagrammatic perspective view showing a usage state of the coordinate input device which is mounted on a case of a computer apparatus.

FIGS. 10 to 12 show another embodiment of the present invention. In this embodiment, the above-described coordinate input device DV is detachably mounted in a recess 110 formed on a case of a computer apparatus 100. According to this configuration, for example, the coordinate input can be conducted on a display device in either of the following manners: The coordinate input is conducted while the coordinate input device remains to be attached to the case of the computer apparatus 100 as shown in FIG. 10. After the coordinate input device is detached from the case of the computer apparatus 100, as shown in FIG. 11, the coordinate input is conducted in a similar manner as that of a track ball. After the coordinate input device is detached from the case of the computer apparatus 100, as shown in FIG. 12, the coordinate input is conducted in a similar manner to that of a mouse.

What is claimed is:

1. A coordinate input device comprising:

two conductors which confront each other in an electrically insulated manner and which form a space between them and a coordinating direction perpendicular to said two conductors; and a dielectric unit which is slidable in the space formed by said two confronting conductors in directions perpendicular to the confronting direction of said two conductors between a reference position and a nonreference position which deviates from said reference position, and which, when a deviation amount from said reference position is changed, changes an electrostatic capacity of said two conductors to a value which corresponds to the deviation amount.

2. A coordinate input device according to claim 1, wherein a coordinate signal is generated on the basis of a variation amount of the electrostatic capacity which varies in accordance with a position of said dielectric unit, and said device further comprising:

an operation knob which is slidable in the sliding directions of said dielectric unit, which can reciprocate in the confronting direction of said two conductors, and which is connected to said dielectric unit only in the sliding direction, thereby causing said dielectric unit to follow said operation knob;

a reference position return spring for always urging said operation knob towards said reference position of said dielectric unit;

a movable unit which is reciprocated in accordance with a reciprocating operation of said operation knob in the confronting direction of said two conductors;

a home-position return spring for always urging said movable unit and said operation knob toward a projection position; and a program mode changeover switch which is switched between an ON-state and an OFF-state by a reciprocating operation of said movable unit.

3. A coordinate input device according to claim 2, wherein said device further comprises: a determination switch for determining a coordinate signal which depends on a position of said dielectric unit in a space formed by said two confronting conductors; and a cancel switch for canceling said coordinate signal.

4. A coordinate input device according to claim 3, wherein said dielectric unit, said two conductors which sandwiches said dielectric unit, and which are respectively disposed on both sides of said dielectric unit, said reference-position return spring, said movable unit, said home-position return spring, and said operation mode changeover switch are housed in a hollow case which can manually be pulled and/or pushed while being held with a hand, said operation knob has a shaft which is connected to said dielectric unit only in the sliding direction of said dielectric unit, and a flange-like operation portion which is disposed at an end of said shaft, and which is exposed from one face of said hollow case, and a determination switch and a cancel switch set disposed on both faces of said hollow case.

5. A coordinate input device according to claim 4, wherein said device further comprises: an operation mode changeover switch for invalidating a switching operation according to said determination switch and said cancel switch disposed on one face of said hollow case, and a switching operation according to said determination switch and said cancel switch disposed on the other face of said hollow case, and for validating the other switching operation.

6. A coordinate input device according to claim 5, wherein said operation mode changeover switch is disposed on a side face of said hollow case.

7. A coordinate input device comprising:

a first member having four electrode faces which are arranged along the periphery of an aperature and at equal angles;

a second member having an electrode face which confronts said four electrode faces of said first member through a gap, and an aperature which is concentric with said aperature of said first member;

a dielectric unit which is disposed between said four electrode faces of said first member and said electrode face of said second member, so as to be slidable in directions which are perpendicular to a confronting direction of said electrode faces of said members;

a movable unit which is attached to said first member so as to be able to reciprocate only in the confronting direction of said four electrode faces of said first member and said electrode face of said second member, and which has an aperature which is concentric with said aperatures of said first and second members;

a program mode changeover switch which is switched between an ON-state and an OFF-state by a reciprocating operation of said movable unit;

an operation knob having a shaft, and a flange-like operation portion which is disposed at an end of said shaft, said shaft being loosely passed through said aperatures of said movable unit and said second member and connected to said dielectric unit so as to be movable in an axial direction, said flange-like operation portion slidably overlapping with a peripheral portion of said aperature of said movable unit;

a reference-position return spring, interposed between said shaft of said operation knob and said movable unit, for always urging said operation knob toward a reference position;

a home-position return spring, interposed between said movable unit and said first member, for always urging said movable unit and said operation knob toward a projection position; and a hollow case which houses said first member, said second member, said dielectric unit, said movable unit, said program mode changeover switch, said reference position return spring, and said home-position return spring, and which can manually be pulled and/or pushed while being held with a hand, said operation portion of said operation knob being exposed from one face side of said hollow case.

8. A coordinate input device according to claim 7, wherein said device further comprises: a determination switch for determining a coordinate signal which depends on a position of said dielectric unit in a space formed by two confronting conductors; and a cancel switch for canceling said coordinate signal.

9. A coordinate input device according to claim 8, wherein a determination switch and cancel switch set is disposed on both faces of said hollow case.

10. A coordinate input device according to claim 9, wherein said device further comprises: an operation mode changeover switch for invalidating a switching operation according to said determination switch and said cancel switch disposed on one face of said hollow case, and a switching operation according to said determination switch and said cancel switch disposed on the other face of said hollow case, and for validating the other switching operation.

11. A coordinate input device according to claim 7, wherein said device is detachably mounted on a case of a computer apparatus having a display device on which a cursor is to be displayed.

* * * * *